(12) United States Patent
Aebi et al.

(10) Patent No.: US 8,531,181 B2
(45) Date of Patent: Sep. 10, 2013

(54) MAGNETIC LINEAR SENSOR ARRANGEMENT

(75) Inventors: Christian Aebi, Schiers (CH); Andreas Imhof, Chur (CH); Joshua Lanter, Ruschein (CH)

(73) Assignee: Polycontact AG, Chur (CH)

( * ) Notice: Subject to any disclaimer, the term of this patent is extended or adjusted under 35 U.S.C. 154(b) by 304 days.

(21) Appl. No.: 12/893,298

(22) Filed: Sep. 29, 2010

(65) Prior Publication Data

US 2011/0043193 A1 Feb. 24, 2011

Related U.S. Application Data

(63) Continuation of application No. PCT/CH2009/000085, filed on Mar. 3, 2009.

(30) Foreign Application Priority Data

Apr. 2, 2008 (CH) ........................................ 500/08

(51) Int. Cl.
*G01B 7/14* (2006.01)
(52) U.S. Cl.
USPC ...................................................... 324/207.2
(58) Field of Classification Search
USPC ................. 324/207.2–207.24, 762.01–762.1, 324/117 R, 117 H; 257/48
See application file for complete search history.

(56) References Cited

U.S. PATENT DOCUMENTS

| | | | |
|---|---|---|---|
| 4,315,214 A * | 2/1982 | Kataoka | 324/207.22 |
| 6,670,806 B2 * | 12/2003 | Wendt et al. | 324/207.24 |
| 6,753,680 B2 | 6/2004 | Wolf | |
| 7,088,095 B1 | 8/2006 | Busch | |
| 7,283,826 B2 * | 10/2007 | Dufour et al. | 455/456.1 |
| 2004/0017187 A1 | 1/2004 | Van Ostrand et al. | |
| 2005/0033529 A1 | 2/2005 | Specht et al. | |

FOREIGN PATENT DOCUMENTS

| | | |
|---|---|---|
| WO | WO 2004/015375 | 2/2004 |
| WO | WO 2005/078395 A | 8/2005 |

OTHER PUBLICATIONS

International Search Report (PCT/ISA/210) issued on Aug. 31, 2009, by European Patent Office as the International Searching Authority for International Application No. PCT/CH2009/000085.

* cited by examiner

*Primary Examiner* — Tung X Nguyen
(74) *Attorney, Agent, or Firm* — Buchanan Ingersoll & Rooney PC (57) ABSTRACT

A magnetic linear sensor arrangement for detecting the position of a component that can be moved along a predefined movement path includes a device disposed along the movement path for generating a magnetic field whose polarity changes along the movement path of the component, and at least one galvanomagnetic detector with at least two measurement fields, which is arranged within the effective region of the magnetic field. The detector can be moved relative to the magnetic field along the movement path of the component. The galvanomagnetic detector is a Hall sensor which is designed to measure the magnetic field spatially or in at least two directions within a plane. The Hall sensor is provided with at least two measurement fields which are rotationally offset and perpendicular to each other in a corresponding plane.

19 Claims, 5 Drawing Sheets

Fig. 11

MAGNETIC LINEAR SENSOR ARRANGEMENT

RELATED APPLICATIONS

This application claims priority as a continuation application under 35 U.S.C. §120 to PCT/CH2009/000085, which was filed as an International Application on Mar. 3, 2009 designating the U.S., and which claims priority to Swiss Application 00500/08 filed in Switzerland on Apr. 2, 2008. The entire contents of these applications are hereby incorporated by reference in their entireties.

FIELD

The disclosure relates to a magnetic linear sensor arrangement for detecting the position of a component that can be adjusted along a predefined movement path.

BACKGROUND INFORMATION

To an increasing extent, electronic components are moving into areas that had long been considered to fall into the realm of mechanics. This also relates in particular to the machine and automobile industry, which equip their products, corresponding to the general trend, with electronics to electronically detect, control, and regulate mechanical functions and/or communicate information to a user. Sensor arrangements and actuators can serve as connecting links between the two worlds to convert the mechanical functions of a component into electronically processible signals and vice versa.

Position sensors can be used to detect the position or the state of movement of a mechanical component. The information that is detected by the position sensor can be converted into electrical signals that change based on the change in position of the component. Position sensors can be an important component in many mechanical products that first enables an intelligent control.

The detection of a path of a component covered along a predefined path is useful, for example, when cutting materials into lengths. The analogous translatory position sensors used for this purpose can work according to Ohm's principle or the induction principle. In both principles, the analog (continuous) conversion of a path into an electrical signal is used. In position sensors based on the ohmic measuring principle, the electrical voltage, whose value depends on the wire length, is scanned by a resistance wire via a slider. Such potentiometers can have the drawback that the slider and the wire are subjected to wear. By the induction principle, a magnetic field, which produces an electric voltage in a coil, is induced in the measuring system via AC voltage. The coil is moved relative to the other measuring system. The voltage induced in the coil depends on its position in the measuring system. Using suitable electronic circuits, a positional measuring signal can be obtained therefrom. The measuring method is contact-free but, an AC voltage source is used and a relatively large electronic expense is used to produce a position measuring signal.

Other known path measuring systems use, for example, magnetic tapes, whose magnetic field is scanned by a read head and is converted into a position measuring signal or path measuring signal. With a wire length sensor, a wire is wound onto a drum or is run on a roller corresponding to the path. The revolutions can be detected and a path measuring signal is produced therefrom. With the magnetostrictive principle, a movable magnet changes its sound reflection properties. With an ultrasound-transit time measurement, the site of the magnet and thus the movement path can be determined in connection with a relatively expensive electronic analysis device.

U.S. Pat. No. 6,753,680 B2 discloses a position sensor that includes two flow conductor rails that run parallel and some distance apart to one another and permanent magnets that are arranged on the ends of the flow conductor rails. A Hall sensor that can be moved relative to the longitudinal extension of the flow conductor rails is arranged in the gap between the flow conductor rails. The output signal that is present at the output of the Hall sensor, which changes subsequent to the relative movement, is further processed and can be used as a measure of the distance covered by the monitored component. Because the sensor is run between rails and the flux density in the mean range is relatively small, the structure can be sensitive to disruption by external magnetic fields and positional tolerances of the sensor.

Known systems that are based on, for example, sliding gauges, operate incrementally, i.e., information on the absolute position of the moved component is available only if it is determined before the measurement of a zero point position, corresponding to a basic output signal, of the sensor. If, for example, in the case of a seat adjustment, first the seat is adjusted before the engine and thus the automobile electrical and electronic systems are put into operation, it is difficult with the known position sensors to determine the exact position of the seat. Moreover, the known magnetic position sensors depend on the amplitude of the detected magnetic field. The effect of this can be that, for example, the Hall sensor has to be adjusted very exactly relative to the flow conductor rails. Inaccuracies in the adjustment or vibration-caused adjustments can have a direct negative effect on the measuring results.

From WO 2004/015375 A1, a magnetoresistive linear position sensor is known that operates based on magnetoresistive detectors, which can be arranged in such a way that they form at least two Wheatstone bridges that have a common center and are twisted relative to one another. Using the two Wheatstone bridges, from the scanned bridge voltages of the two Wheatstone bridges, which change with the translatory passing movements of a bar magnet or a magnet arrangement that is arranged at a certain distance, the direction of the magnetic flux density can be derived. For a bar magnet that is magnetized in the translational direction, sinusoidal plots of the flux density can be produced from a pole of the magnet. From the superposition of sinusoidal plots measured from the two Wheatstone bridges, an essentially linear connection can be produced between the movement path of the bar magnet and the change of the angle of the vector of the magnetic flux density. Thus, from the direction of the vector of the magnetic flux density, the length of the movement path can be derived. The sensitivity of the sensor depends on the length of the bar magnet or on the total length of the magnetic arrangement and on the magnetic pole shape. Also, the magnet(s) should be arranged at a very specifically defined distance to the arrangement of the two Wheatstone bridges. The magnetic field strength should be large enough so that the individual magnetoresistive detectors are found in the saturation state in order to prevent the resistance of the magnetoresistive detectors from changing based on the amount of the magnetic flux density and to prevent the measuring results from changing. These known linear position sensors include a number of magnetoresistive detectors that are assembled into at least two Wheatstone bridges that are twisted toward one another, and a magnet arrangement that is relatively complex and involves a relatively large expenditure for the adjustment of the components to one another.

SUMMARY

A magnetic linear sensor arrangement is disclosed for detecting a position of a component that can be adjusted along a predefined movement path, the arrangement including a device for producing a magnetic field along a movement path of a component such that a polarity of the magnetic field will change along the movement path, and at least one galvanomagnetic detector arranged in an effective region of the magnetic field with at least two measurement fields, wherein the detector can be adjusted relative to the magnetic field along the movement path of the component, and the galvanomagnetic detector being a Hall sensor for measuring the magnetic field in a plane or in a space.

A method is disclosed for contact-free detection of a movement position of a component including producing a magnetic field along a movement path of a component such that a polarity of the magnetic field will change along the movement path, and arranging at least one galvanomagnetic detector in an effective region of the magnetic field with at least two measurement fields, wherein the detector can be adjusted relative to the magnetic field along the movement path of the component, and the galvanomagnetic detector being a Hall sensor for measuring the magnetic field in a plane or in a space.

BRIEF DESCRIPTION OF THE DRAWINGS

Additional advantages and features of the disclosure are found in the following description of the schematic representations of exemplary embodiments of the magnetic linear sensor arrangement according to the disclosure wherein.

DETAILED DESCRIPTION

An exemplary magnetic linear sensor arrangement is disclosed that makes it possible to detect a transverse path covered along a predefined path in a simple way and without great electronic expense and to determine an absolute position of an adjustable component. The exemplary magnetic linear sensor arrangement is not to be controlled absolutely. The specifications for adjustment accuracy can be reduced, and the linear sensor arrangement can be largely insensitive relative to vibrations. The linear sensor arrangement can operate free from wear and to have a simple and economical design.

An exemplary magnetic linear sensor arrangement according to the disclosure for detecting the position of a component that can be adjusted along a predefined movement path, has a device for producing a magnetic field that is arranged along the movement path and whose polarity changes along the movement path of the component, and at least one galvanomagnetic detector, arranged in the effective region of the magnetic field, with at least two measurement fields. The detector can be adjusted relative to the magnetic field along the movement path of the component. The galvanomagnetic detector can be a Hall sensor that is designed so as to measure the magnetic field in at least two directions in a plane or in space. To this end, the Hall sensor can be equipped with at least two measuring fields, which are twisted perpendicular to one another in a plane that is formed by them.

By a Hall sensor with at least two measuring fields that are twisted toward one another being used, the magnetic linear sensor can be designed directly for vectorial evaluation of the magnetic field. No complicated detour via Wheatstone bridges that are twisted relative to one another is necessary to determine the change in the angle of the magnetic flux density. The two measuring fields form a plane with defined x- and y-directions. The angle of the magnetic flux density is produced with an arc-tangent relationship directly from the x- and y-components of the magnetic field vector that are detected by the Hall sensor and has a virtually linear dependence on the movement path. The magnetic field strength plays a subordinate role. It can be used to determine whether the Hall sensor is actually found in the area of influence of the magnetic field. The magnetic field strengths need not be as high as in known sensors, because saturation effects of magnetoresistive elements are not a factor. The magnetic linear sensor arrangement has a simple and sturdy design. The specifications for adjusting accuracy are not critical, because the magnetic field strength can have only a slight effect on the measurement.

By the device for producing the magnetic field being magnetized perpendicular to the direction of movement and parallel to the plane of the measuring fields of the Hall sensor, it can act like a point magnetic field source and spatial expansion effects on the vector of the magnetic flux density can be negligible.

By the device for producing the magnetic field along the movement path advantageously changing its polarity at least twice, the vector of the magnetic flux density specifies 360°. As a result, a larger movement path can be detected.

In an exemplary embodiment of the magnetic linear sensor arrangement, the device can have at least two permanent magnets for producing the magnetic field, and the permanent magnets can be arranged some distance apart along the movement path and have opposite polarities. The individual magnets form almost point magnetic field sources, and the Hall sensor can be adjustable relative to their range of influence. In this case, the change in the direction of the vector of the magnetic flux density can be detected in a range of 0° to 180°, and the movement path is determined therefrom.

It can be desirable for the magnets to have a ratio of a length, that is measured in the direction of movement, to a width, that is measured in its magnetization direction, of 2:1 to 10:1. This can improve the jamming resistance relative to the magnetic fields of external magnets or ferromagnetic parts, which are found in the environment or adhere to the magnets. The longitudinal extension specifically has an effect on the linearity. The low non-linearity, however, can be corrected with sensor-integrated look-up tables. The magnets can have a height to width ratio that is for example 1:5 to 5:1.

For the quality of the magnetic linear sensor, the magnetic material plays a subordinate role. Nevertheless, relatively strong magnets are advantageous that include materials that are selected from the group that includes (e.g., consists of) SmCo, ferrites, NdFeB and plastic-bonded variants of these substances.

With an arrangement of three individual magnets with opposite polarity in each case, the change of the vector of the magnetic flux density can be detected in a range of 0° to 360°. As a result, a relatively long measuring range of, for example, up to 300 mm can be achieved. For many applications, however, it is desirable to expand the measuring range still further. To this end, at least individual magnets arranged behind one another along the movement path and different distances apart from the plane that is formed by the measuring fields of the Hall sensor. By the distance of individual magnets being varied from that of the x, y-plane formed by the measuring fields of the Hall sensor, the z-component of the vector of the magnetic flux density can also be used for the measurement to widen the measuring range. While the evaluation of the x- and y-components of the vector uses the magnetic flux density for the measurement of 0° to 360° and the respective reference to the movement path within a triad of magnets from the north pole to the south pole to the north pole (or south pole to north pole to south pole), the z-component can be used to determine the various triads of magnets and thus the period of twisting of the vector. As a result, the measuring range of the magnetic linear sensor can be scaled up almost indefinitely. In this case, this is not an incremental measurement but rather the movement path can be measured absolutely. The temporary value of the z-component indicates which triad group of magnets or which 360° period is involved and thus together with the angle determined from the x- and y-components yields the absolute value of the movement path. In the case of, for example, the measurement of the movement path of a motor vehicle seat, the measurement can be independent of a zero-point determination. Also, when the driver's seat was adjusted, before the ignition and thus the electronic device was activated, the position of the seat can be determined exactly with the magnetic linear sensor arrangement.

An exemplary embodiment of the magnetic linear sensor arrangement calls for, for example, the magnets arranged behind one another along the movement path to be assembled in pairs and in each case in pairs at increasing distances from the plane that is formed on the measuring fields of the Hall sensor. The individual magnet pairs in each case stand for an angular measuring range of 0°-180°, which corresponds to the respective movement path along a magnet pair (north pole—south pole). The different z-coordinates of the magnet pair can then be used to differentiate the various magnet pairs and thus indicate the expanded distance measuring range.

Another exemplary embodiment of the magnetic linear sensor arrangement calls for the magnets that are arranged along the movement path to be assembled in groups and to have intervals numbered alternately in the positive and negative directions from the plane that is formed by the measuring fields of the Hall sensor, where the intervals increase or decrease in the direction of movement. For example, these are groups of respectively three individual magnets, which in each case can allow the detection of a full 360° period of the vector of the magnetic flux density within a triad group of magnets (north pole—south pole—north pole or south pole—north pole—south pole). The z component of the respective triad group then supplies the information on the respective 360° period or the respective triad group. Together with the measured angle of the vector of the magnetic flux density, it allows the z-components to determine the absolute value of the movement path.

In an exemplary embodiment of the magnetic linear sensor arrangement, a number of successive magnets, which are arranged some distance apart along the movement path and are magnetized perpendicular to the direction of movement, have magnetization directions that in each case enclose an angle of greater than 0° with one another. The magnetization directions of successive magnets run respectively perpendicular to the direction of movement. They enclose, however, various angles with one another and with the plane that is formed by the measuring fields of the Hall sensor. This yields different z-components, from which the respective period can be derived.

An especially simple variant to change the magnetization directions of successive magnets include orienting magnets parallel to each other's axes, and arranging them twisted relative to one another.

For the detection of movement paths in space, the magnets can be arranged along a corresponding arbitrary curve in space in another variant of the disclosure.

The Hall sensor of the magnetic linear sensor arrangement can describe an arbitrary curve in space for detecting the adjustment of the component and can also be twisted with respect to the orientation of its measuring fields.

As applications for the magnetic linear sensor arrangement according to the disclosure, general linear sensor technologies, for example, the contact-free detection of the movement position of the components in a motor vehicle, the path measurement of shock absorbers, and the electrical, pneumatic and hydraulic cylinders, etc., can be suitable.

Figure 1:
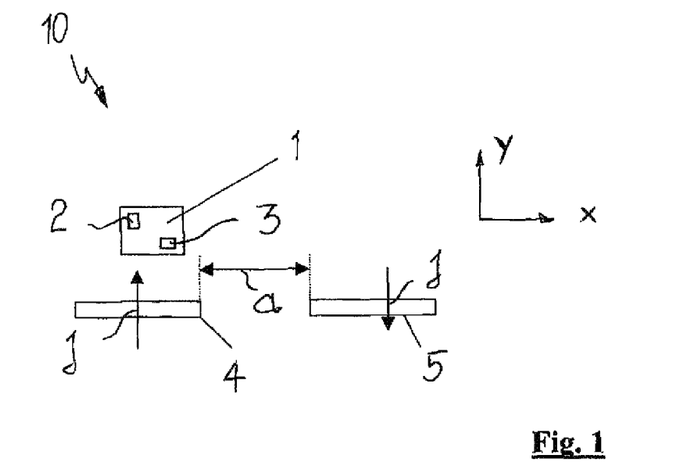
FIG. 1 shows the schematic design of a first exemplary embodiment of a magnetic linear sensor arrangement according to the disclosure with two opposite polarized permanent magnets and a Hall sensor.

In FIG. 1, an exemplary magnetic linear sensor arrangement according to the disclosure is depicted and is designated as a whole with the reference number 10. The magnetic linear sensor arrangement 10, which can be used in, for example, automobile design for monitoring a movable component, for example a seat or a gas pedal, for measuring the path of shock absorbers or of electrical, pneumatic and hydraulic cylinders, etc., includes a galvanomagnetic detector, which can be formed by a Hall sensor 1, and at least two permanent magnets 4, 5 with opposite polarities J, which can be arranged at a distance "a" long an adjustment path for a component to be monitored. The Hall sensor 1 can be associated with the adjustable component, while the permanent magnets 4, 5 can be arranged in a stationary manner along the movement path. The Hall sensor 1 is designed for vectorial evaluation of the magnetic field that is produced by the permanent magnets and to this end has at least two Hall measuring fields 2, 3 that are twisted relative to one another by 90° in the x, y-planes formed by them, which is indicated in FIG. 1 by the coordinate axes x and y. As a result, the Hall sensor 1, which can include an integrated evaluating unit, can detect the x- and the y-components of the vector of the magnetic flux density of the magnetic field that is produced by the permanent magnets 4, 5 in an adjustment relative to the permanent magnets 4, 5, and can determine therefrom the angle of the vector of the magnetic flux density with an arc-tangent relationship.

In the movement of the Hall sensor 1 along the magnetic field produced by the two opposite polarized (magnetized) permanent magnets 4, 5, the vector of the magnetic flux density runs through an angular range of 180°, which is made directly proportional to the length of the distance moved to determine directly therefrom the exact position of the monitored component. Thus, the linear sensor arrangement according to the disclosure represents a use of an angular sensor for a linear measurement. The two permanent magnets 4, 5 in this case form almost point magnetic field sources. The distance of the Hall measuring fields 2, 3 of the Hall sensor 1 from the permanent magnets 4, 5 can be, for example, 6 mm. The permanent magnets 4, 5 have, for example, a property remanence of about 1 T. The tolerance with respect to the positioning accuracy of the galvanomagnetic detector in proportion to the permanent magnet can be high and can be up to a few centimeters. Accordingly, the system can be sturdy and insensitive to vibrations. From the detected absolute magnetic field strength, it can be determined whether the Hall sensor is actually found in the area of influence of the magnetic field. Depending on the dimensioning of the magnets 4, 5 and their distance "a," an adjustment range of up to 300 mm, typically up to 100 mm, can be produced with such a linear sensor arrangement. Typically, the distance from the adjacent permanent magnets 4, 5 is up to 50 mm.

Suitably, the permanent magnets can have a ratio of a length that is measured in the direction of movement x to a measured crosswise (y-direction) width of 2:1 to 10:1. A magnetic linear sensor arrangement 10 for a measuring area of up to 100 mm in this case typically points to permanent magnets with a width of 3 mm-5 mm. The length of the magnets can then be up to 50 mm. The height of the permanent magnets can be less than or equal to their width and moves in the range of a mm to several mm. Because of the better jamming resistance relative to magnetic fields of external magnets or relative to disturbances by ferromagnetic parts, which can be found in the environment or adhere to the magnets, it is advantageous to stretch the magnets in the longitudinal direction. This can have an effect on the linearity of the angle-length relationship, but can be very easily corrected by Look-up Tables integrated in the evaluation unit of the Hall sensor. The magnetic material plays only a negligible role. Therefore, strong magnets are desirable. Typically, permanent magnets that include SmCo, ferrites or NdFeB can be used, which can also be plastic-bonded.

Figure 2:
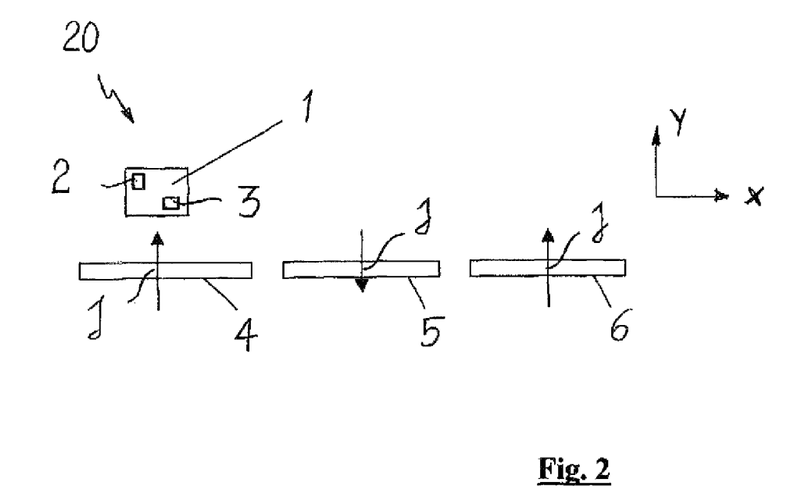
FIG. 2 shows an exemplary embodiment of the magnetic linear sensor arrangement with three permanent magnets.

FIG. 2 shows a magnetic linear sensor arrangement that is provided as a whole with the reference number 20. In turn, it has a Hall sensor 1 with at least two Hall measuring fields 2, 3, which are adjustable relative to a magnetic field that is produced by permanent magnets 4, 5, and 6. The permanent magnets 4, 5, 6 of adjacent magnets in each case have opposite polarities J. While, for example, the magnet 4 turns the magnetic north pole toward the observer, the magnet 5 shows its magnetic south pole, and with magnet 6, the observer again sees its magnetic north pole. In the adjustment of the Hall sensor 1 relative to the permanent magnets 4, 5, 6, the vector of the magnetic flux density changes from the north pole to the south pole and again back to the north pole, i.e., it describes an arc of 360°. As in the exemplary embodiment described in FIG. 1, it can be derived from the angle of the magnetic flux density directly on the path covered by the Hall sensor or the monitored component or on the absolute position of the component. The 360° angular range described by the vector of the magnetic flux density can be directly converted into linear path information.

Figure 3:
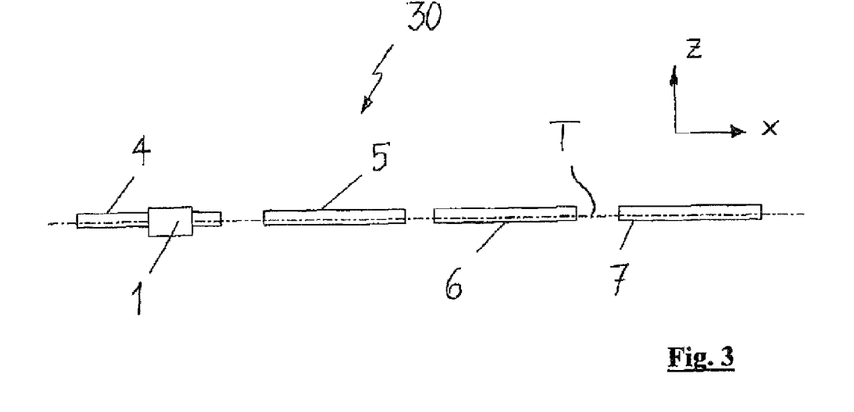
FIG. 3 shows a magnetic linear sensor arrangement with an arbitrary number of opposite polarized permanent magnets.

FIG. 3 shows a magnetic linear sensor arrangement 30, which in turn shows a Hall sensor 1 and a number of permanent magnets 4, 5, 6, 7 arranged periodically along a movement path T of a component. Although this is not shown in FIG. 3, in each case adjacent permanent magnets in turn have opposite polarities. With the Hall sensor 1, the indication of the Hall measuring field was eliminated. The representation in FIG. 3 shows the linear sensor arrangement 30 in a top view on the x, y-plane formed by the Hall measuring fields. This is indicated in the representation through the x and z coordinate system.

Figure 4:
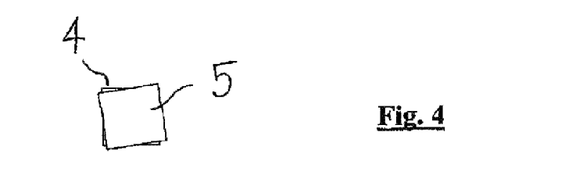
FIG. 4 shows a schematic of two permanent magnets that are twisted relative to one another.

The periodic arrangement of the permanent magnets 4-7 produces a periodic magnetic field from which the Hall sensor, when it runs over it, produces a periodically repeating sensor signal. After three permanent magnets of different polarity, the vector of the magnetic flux density begins a new 360° period. Thus, the individual periods can be held from one another, for example, the successive magnets can be twisted relative to one another. This is indicated in FIG. 4 in the example of the permanent magnets 4 and 5, which have a common axis, but whose longitudinal sides encompass an angle with one another that can be greater or less than 0° (depending on the numerical convention). By the twisting of adjacent magnets relative to one another, the magnets for the Hall sensor have a different magnetization direction, which is used for the differentiation of 360° periods.

Figure 5:
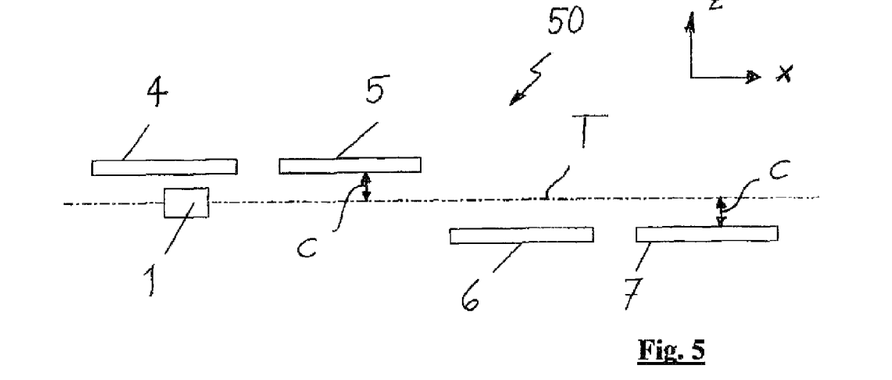
FIG. 5 shows an exemplary embodiment of a magnetic linear sensor arrangement with permanent magnets that are arranged offset to one another relative to a third space coordinate.

An exemplary embodiment of a magnetic linear sensor arrangement that is depicted in FIG. 5 is provided as a whole with the reference number 50. In turn, it includes a Hall sensor 1, which can be designed for the vectorial evaluation of the detected magnetic field, and an arrangement of permanent magnets 4, 5, 6, and 7. In each case in the movement direction T, adjacent permanent magnets have opposite polarities. The permanent magnets can be assembled, for example, in pairs, and have distances "c" in pairs that can be different from the x, y-plane that is formed by the Hall measuring fields of the Hall sensor 1. The evaluation of the z-component of the magnetic field produced by the permanent magnets can be used to determine the respective 180° period. As a result, significantly larger longitudinal areas can be covered. For example, a longitudinal area of up to 1 meter and more can be covered with an arrangement of 10 pairs of permanent magnets of a dimension (width×height×length) of 4×4×20.

Figure 6:
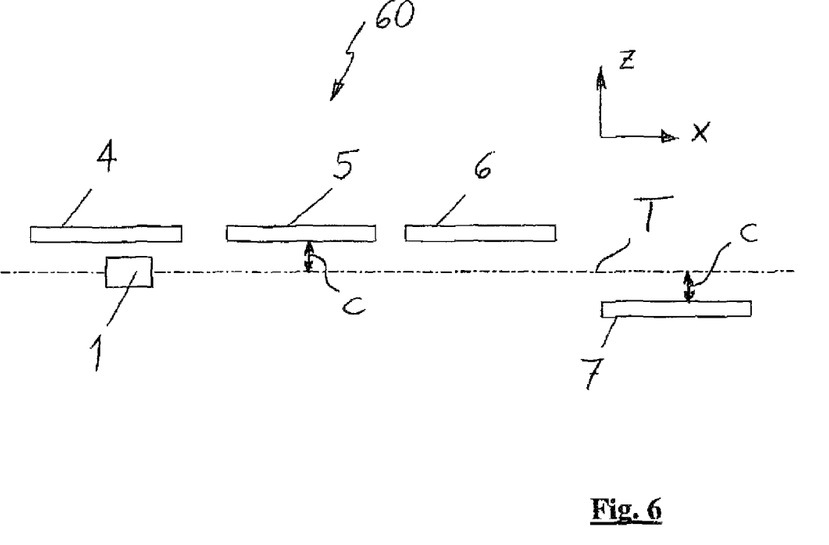
FIG. 6 shows an exemplary embodiment of a magnetic linear sensor arrangement analogous to FIG. 5.

In turn, FIG. 6 shows an exemplary magnetic linear sensor arrangement 60 with a Hall sensor 1 and a periodic magnet arrangement 4, 5, 6 and 7. In each case, along a direction of movement T, adjacent magnets in turn have opposite polarities. The sensor signal that is produced when the Hall sensor 1 runs over the magnets 4-7 is repeated periodically relative to the angle of the magnetic flux density. The magnets to be assembled in triad groups in this case cover a period of 360°. An individual subsequent magnet 7 with offset in z-direction allows a differentiation of the respective 360° period.

Figure 7:
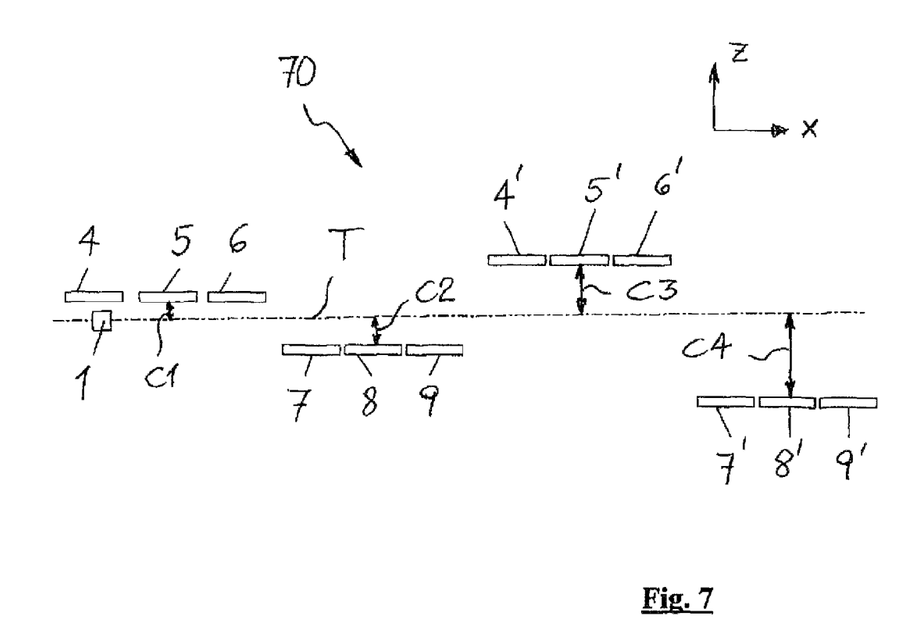
FIG. 7 shows another exemplary embodiment of a magnetic linear sensor arrangement with permanent magnets that are assembled in groups and are arranged offset to one another relative to a third space coordinate.

An exemplary magnetic linear sensor arrangement that is depicted in FIG. 7 bears as a whole the reference number 60. It has a Hall sensor 1 and a number of permanent magnets 4, 5, 6 or 7, 8, 9 or 4', 5', 6' and 7', 8', 9' arranged in triad groups along a distance moved T. Each of the triad groups has a specific distance $c_1, c_2, c_3, c_4$ in the z-direction of the magnetic field produced by the magnets. A triad group of opposite polarized individual magnets allows the detection of a 360° area of the vector of the magnetic flux density. The different distances c1, c2, c3, c4 of the individual triad groups of the x, y-plane defined by the Hall measuring fields of the Hall sensor 1 allow a differentiation of the respective period and thus an absolute determination of the Hall sensor 1 that is moved with the monitored component. For example, 10 triad groups of opposite polarized (north pole, south pole, north pole) permanent magnets can be assembled in order to produce a relatively large adjustment range of typically up to 2 meters.

Figure 8:
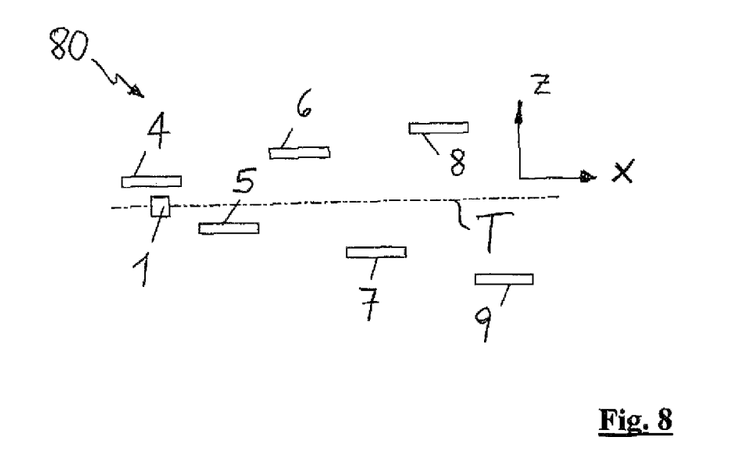
FIG. 8 shows an exemplary embodiment of a magnetic linear sensor arrangement with alternating positive and negative and increasing distances of the permanent magnets from a movement path of a component.
Figure 9:
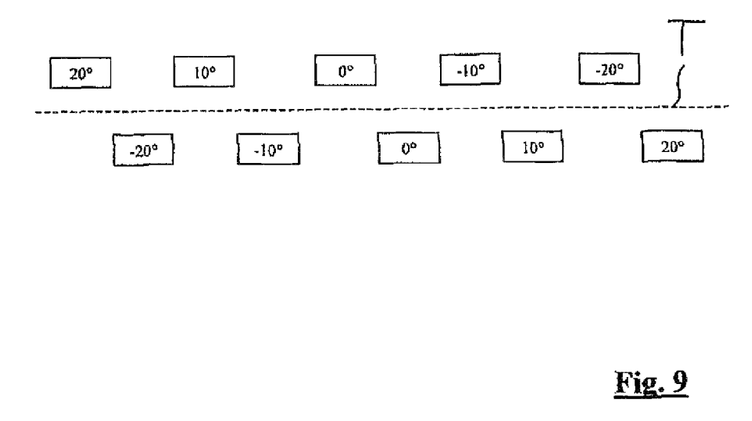
FIG. 9 shows an exemplary embodiment of a magnetic linear sensor arrangement with permanent magnets that are twisted in an alternating manner at positive or negative angles relative to one another.

An exemplary magnetic linear sensor arrangement that is depicted in FIG. 8 is provided as a whole with the reference number 80. It includes an arrangement of permanent magnets 4, 5, 6, 7, 8, 9 that can be arranged on both sides along a movement path T and in each case have a distance, measured in the direction of the z-component of the magnetic field that is produced by it, from the plane that is formed by the Hall measuring fields of the Hall sensor 1, which plane is scaled up. Also, this arrangement allows the differentiation of different measuring periods. In addition, the individual magnets can also be twisted in an alternating manner relative to the plane that is formed by the Hall measuring fields, which plane is indicated in FIG. 9.

Figure 10:
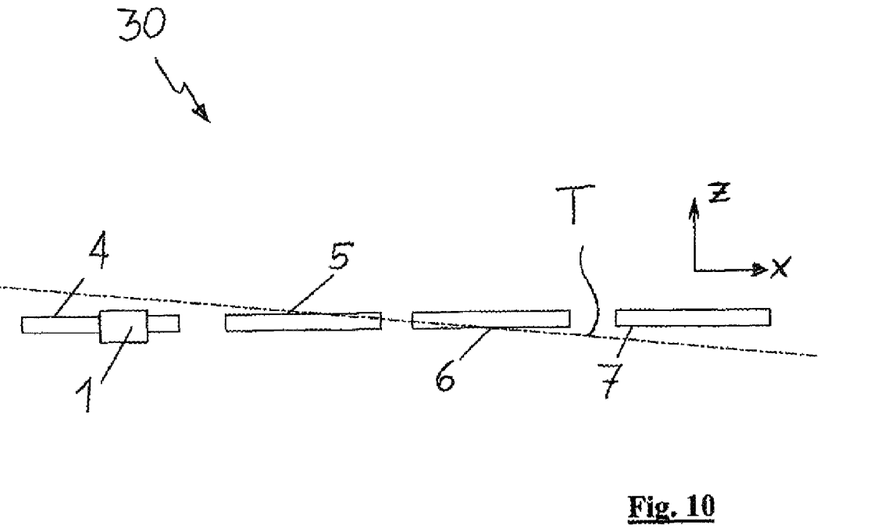
FIG. 10 shows a magnetic linear sensor arrangement in a movement path of a component that runs obliquely to the arrangement of the permanent magnets.

FIG. 10 shows an exemplary magnetic linear sensor arrangement 30 according to the representation in FIG. 3. By the movement path T that is tilted in the direction of the z-coordinate, it is indicated that the adjustment does not have to take place exactly in the direction of the arrangement of the permanent magnets.

Figure 11:
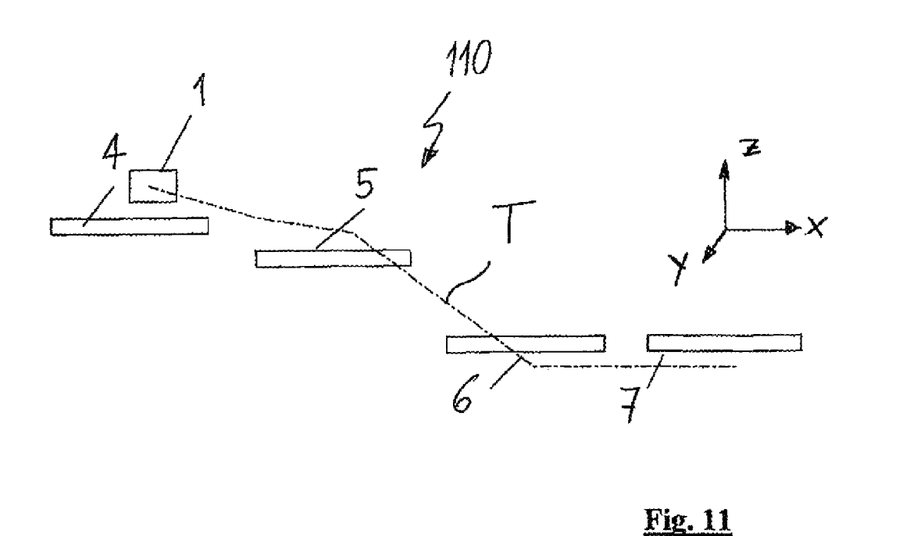
FIG. 11 shows a magnetic linear sensor arrangement with permanent magnets arranged arbitrarily in space and with an arbitrary spatial curve, which is described in the adjustment of a component of the Hall sensor.

Finally, FIG. 11 shows an exemplary magnetic linear sensor arrangement 110, in which the arrangement of the permanent magnets 4, 5, 6, 7 is not limited to a plane but rather the latter can be arranged along a path that runs indefinitely in space. The Hall sensor 1 moves relative to the permanent magnets along a movement path T, which describes a spatial curve. In addition, the Hall sensor 1 can also be twisted relative to the permanent magnets that are arranged in space.

It is understood that in all representations, adjacent permanent magnets have opposite polarities. The respective direction of observation is indicated by the coordinate systems x, y or x, z, or x, y, z.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Magnetic linear sensor arrangement for detecting a position of a component that can be adjusted along a predefined movement path, the arrangement comprising:
    a device for producing a magnetic field along a movement path of a component such that a polarity of the magnetic field will change along the movement path; and
    at least one galvanomagnetic detector arranged in an effective region of the magnetic field with at least two measurement fields, wherein the detector can be adjusted relative to the magnetic field along the movement path of the component, and the galvanomagnetic detector being a Hall sensor for measuring the magnetic field in a plane or in a space,
    wherein the Hall sensor has at least two measuring fields, which are twisted perpendicular to one another in a plane that is formed by them.

2. Magnetic linear sensor arrangement according to claim 1, wherein the movement path describes an arbitrary curve in space.

3. Magnetic linear sensor arrangement according to claim 1, wherein the device for producing the magnetic field is magnetized perpendicular to a direction of movement and parallel to the plane of the measuring fields of the Hall sensor.

4. Magnetic linear sensor arrangement for detecting a position of a component that can be adjusted along a predefined movement path, the arrangement comprising:
    a device for producing a magnetic field along a movement path of a component such that a polarity of the magnetic field will change along the movement path; and
    at least one galvanomagnetic detector arranged in an effective region of the magnetic field with at least two measurement fields, wherein the detector can be adjusted relative to the magnetic field along the movement path of the component, and the galvanomagnetic detector being a Hall sensor for measuring the magnetic field in a plane or in a space,
    wherein the device for producing the magnetic field is magnetized perpendicular to a direction of movement and parallel to the plane of the measuring fields of the Hall sensor.

5. Magnetic linear sensor arrangement according to claim 4, wherein the device for producing the magnetic field along the movement path changes polarity of the magnetic field at least twice.

6. Magnetic linear sensor arrangement according to claim 4, wherein the device for producing the magnetic field comprises:
    at least two permanent magnets that are arranged at a distance from one another along the movement path and have opposite polarities.

7. Magnetic linear sensor arrangement according to claim 6, wherein the magnets have a length that is measured in a direction of movement, and a ratio of the length to a width of the magnets, when measured in its magnetization direction, is 2:1 to 10:1.

8. Magnetic linear sensor arrangement according to claim 7, wherein the magnet materials are selected from the group that consists of SmCo, ferrites, NdFeB, and plastic-bonded variants of these substances.

9. Magnetic linear sensor arrangement according claim 7, wherein at least individual magnets arranged behind one another along the movement path are different distances apart from a plane that is formed by the measuring fields of the Hall sensor.

10. Magnetic linear sensor arrangement according to claim 6, wherein the magnet materials are selected from the group that consists of SmCo, ferrites, NdFeB, and plastic-bonded variants of these substances.

11. Magnetic linear sensor arrangement according claim 10, wherein at least individual magnets arranged behind one another along the movement path are different distances apart from a plane that is formed by the measuring fields of the Hall sensor.

12. Magnetic linear sensor arrangement according claim 6, wherein at least individual magnets arranged behind one another along the movement path are different distances apart from a plane that is formed by the measuring fields of the Hall sensor.

13. Magnetic linear sensor arrangement according to claim 12, wherein the magnets arranged behind one another along the movement path are assembled in pairs and in each case the pairs are at increasing distances from the plane that is formed by the measuring fields of the Hall sensor.

14. Magnetic linear sensor arrangement according to claim 12, wherein the magnets that are arranged along the movement path are assembled in groups and have intervals numbered alternately in positive and negative directions from the plane that is formed by the measuring fields of the Hall sensor, and the intervals increase or decrease in a direction of the movement.

15. Magnetic linear sensor arrangement according to claim 12, wherein the Hall sensor is designed to measure, as additional positional information, to determine a magnet group, components of a magnetic field perpendicular to a plane that is formed by the measuring fields.

16. Magnetic linear sensor arrangement for detecting a position of a component that can be adjusted along a predefined movement path, the arrangement comprising:
   a device for producing a magnetic field along a movement path of a component such that a polarity of the magnetic field will change along the movement path; and
   at least one galvanomagnetic detector arranged in an effective region of the magnetic field with at least two measurement fields, wherein the detector can be adjusted relative to the magnetic field along the movement path of the component, and the galvanomagnetic detector being a Hall sensor for measuring the magnetic field in a plane or in a space,
   wherein the device for producing the magnetic field has a number of magnets that are arranged a distance apart along the movement path and are magnetized perpendicular to a movement direction, whereby subsequent magnets enclose an angle with one another that is greater than 0°.

17. Magnetic linear sensor arrangement according to claim 16, wherein the subsequent magnets are oriented parallel to each other's axes, but are arranged twisted relative to one another.

18. Magnetic linear sensor arrangement for detecting a position of a component that can be adjusted along a predefined movement path, the arrangement comprising:
   a device for producing a magnetic field along a movement path of a component such that a polarity of the magnetic field will change along the movement path; and
   at least one galvanomagnetic detector arranged in an effective region of the magnetic field with at least two measurement fields, wherein the detector can be adjusted relative to the magnetic field along the movement path of the component, and the galvanomagnetic detector being a Hall sensor for measuring the magnetic field in a plane or in a space,
   wherein the Hall sensor describes an arbitrary curve in space in an adjustment and can be twisted with respect to an orientation of its measuring fields.

19. Method for contact-free detector of a movement position of a component comprising:
   producing a magnetic field along a movement path of a component such that a polarity of the magnetic field will change along the movement path; and
   arranging at least one galvanomagnetic detector in an effective region of the magnetic field with at least two measurement fields, wherein the detector can be adjusted relative to the magnetic field along the movement path of the component, and the galvanomagnetic detector being a Hall sensor for measuring the magnetic field in a plane or in a space
   wherein the Hall sensor has at least two measuring fields, which are twisted perpendicular to one another in a plane that is formed by them.

* * * * *